July 8, 1958    J. MAURICE ET AL    2,842,008
OVERDRIVE TRANSMISSION SYSTEM FOR AUTOMOBILE VEHICLES
Filed Jan. 4, 1956    3 Sheets-Sheet 1

United States Patent Office 2,842,008
Patented July 8, 1958

2,842,008

OVERDRIVE TRANSMISSION SYSTEM FOR AUTOMOBILE VEHICLES

Jean Maurice and Michel Rist, Paris, France, assignors to Societe Anonyme Francaise du Ferodo, Paris, France, a corporation of France Application January 4, 1956, Serial No. 557,352

Claims priority, application France January 17, 1955

11 Claims. (Cl. 74—472)

The present invention relates to transmission systems of automobile vehicles comprising a clutch, a gear box, and also an epicyclic or hypocyclic over-drive device which is rendered active or inactive at will by an appropriate control. An additional gear device of the so-called "over-drive" type is so termed in its active position, while in its inactive position the transmission is in "direct-drive." This usual terminology will be adopted in the text following.

The changes from the over-drive position to the direct-drive position and vice-versa are generally effected in an automatic manner, for example as a function of the speed of the vehicle. Depending on whether the speed is greater or less than a pre-determined value, the device takes up the over-drive or direct-drive positions.

However, when the user running in the over-drive position at a vehicle speed greater than the value referred to desires to accelerate the vehicle rapidly, it is advisable that he may then be able to pass into the direct-drive position at will. Means are generally provided to that end, and comprise an operating member intended to be actuated at will by the user, at the same time as he presses down the accelerator. This member may be coupled to the travel of the accelerator and may become active during an appreciable extension of this travel. An operation of this kind is generally termed "kick-down." The operating member may however not have any coupling with the travel of the accelerator pedal, the user then taking steps to suitably co-ordinate the actuation of the operating member and the full depression of the accelerator pedal. In the text which follows, the term "kick-down" is adopted to designate the actuation of the operating member both in the first case and in the second.

During the course of the kick-down action, the operating member is arranged so as to render the over-drive inoperative but, by reason of the high value of the torque then applied to the transmission, certain precautions are necessary. To this end, it has already been proposed to cut-off the ignition and/or to introduce a frictional slip between the epicyclic members of the over-drive. These known measures have however disadvantages, in particular, risk of failure, more or less extensive knocking of the engine, increase wear of the parts, and also a lack of synchronisation which is liable to produce jerks.

The present invention has for its object improvements in the transmission of automobile vehicles of the type referred to, and is particularly characterised by a coupling between the control of the clutch of the vehicle and the kick-down control of the over-drive. This coupling is provided in such manner as to cause decoupling of the clutch of the vehicle when the kick-down operating member is actuated, and has for its object to permit, during this operation, of an increase in the motor speed which assists in synchronisation. All risk of failure and any cut-off of the ignition are furthermore eliminated.

The clutch of the vehicle is preferably provided with an electric control, such as an electro-magnetic, electro-centrifugal, hydro-electric, electro-mechanical, electro-pneumatic clutch, or the like, an electric contact actuating this control being provided and acting in dependence on the kick-down action.

The invention is described in greater detail below, by way of example, with reference to the attached drawings, in which:

Fig. 4 is a view of a further over-drive arrangement.

Figure 1:
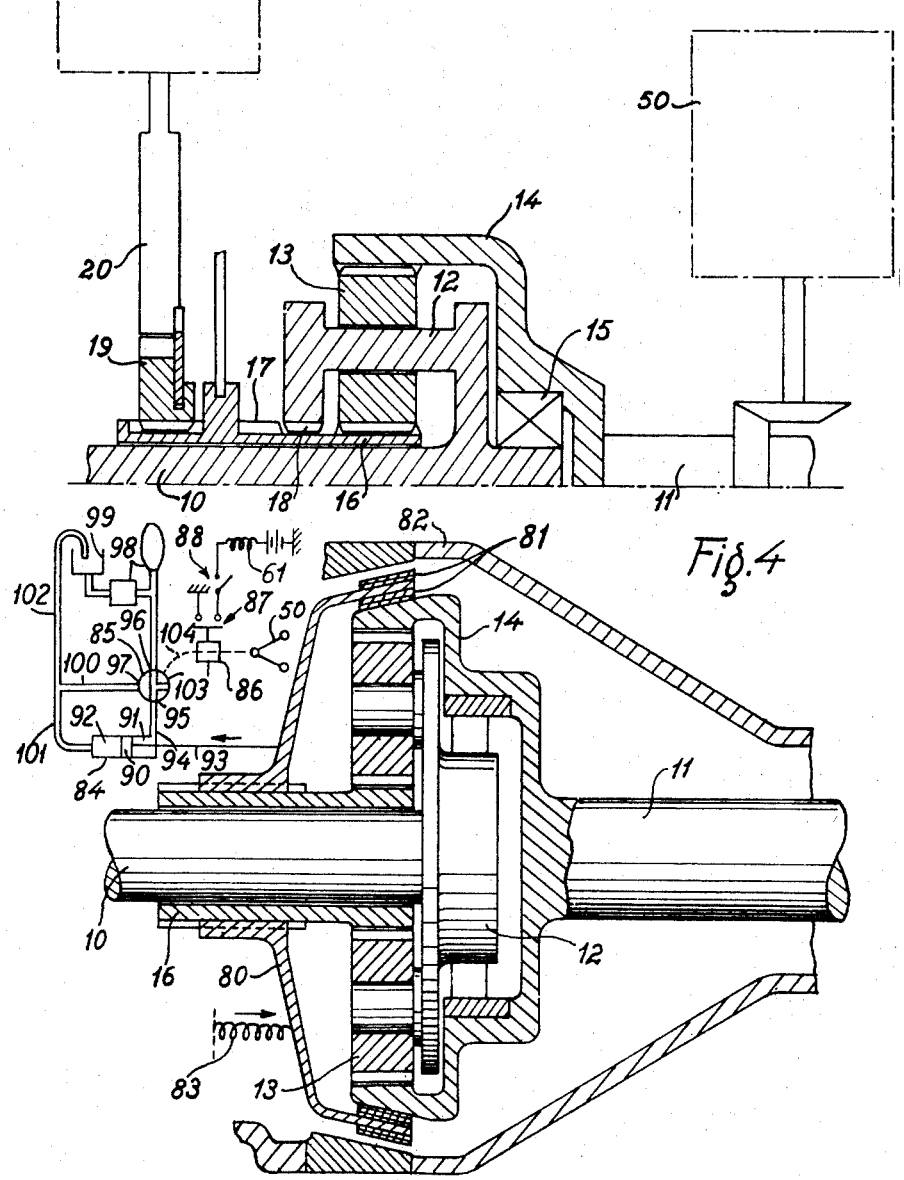
Fig. 1 is a diagrammatic view of an over-drive.
Figure 2:
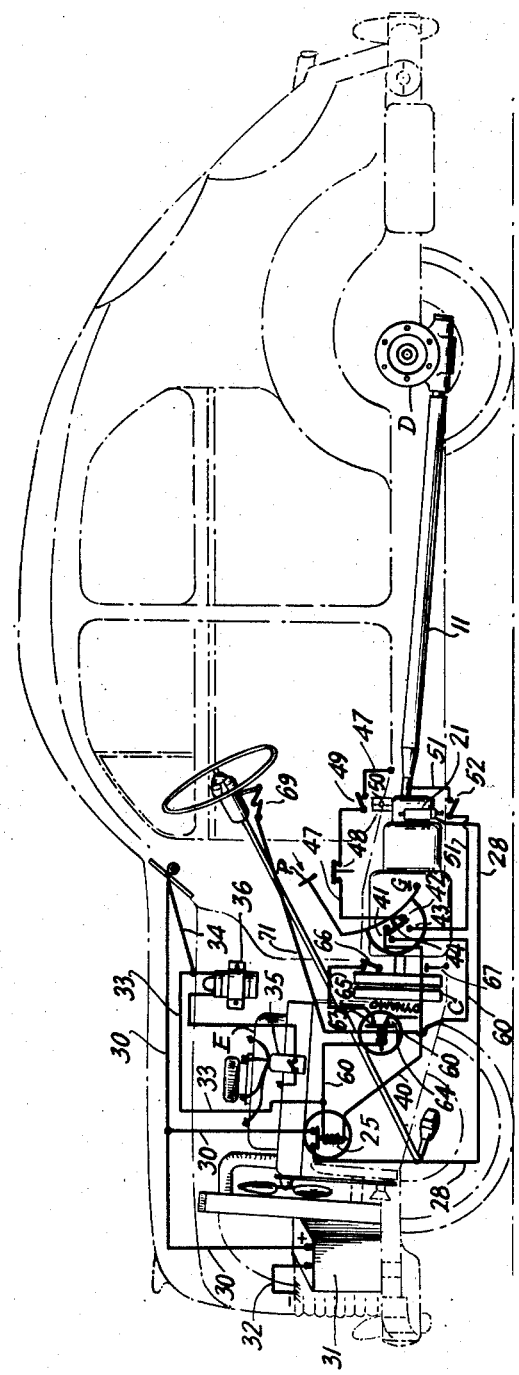
Fig. 2 is a general view of an automobile vehicle provided with a system in accordance with the invention.
Figure 3:
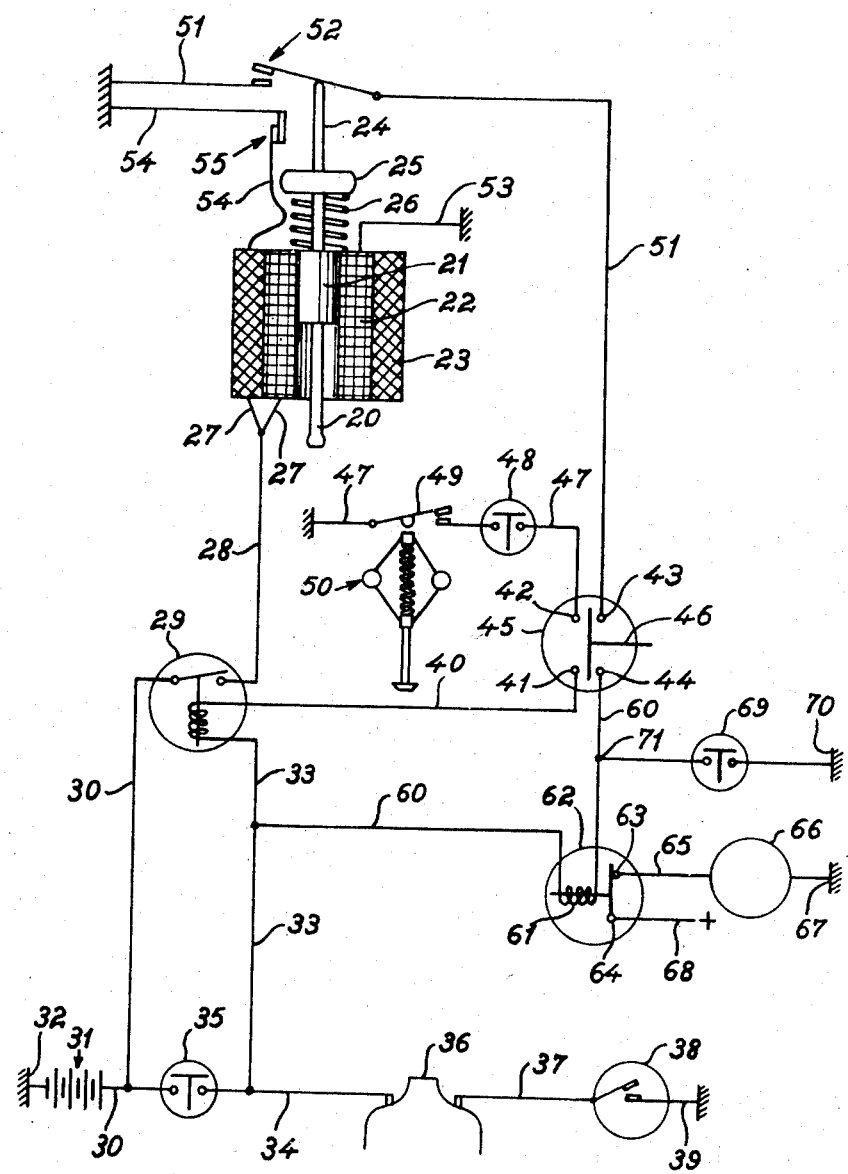
Fig. 3 is an electrical diagram illustrating a control system of this over-drive, in accordance with the invention.

With reference first of all to Figs. 1 to 3, in which there is shown at 10 the secondary shaft of a gear-box G of an automobile vehicle having an engine E, an accelerator pedal P, a clutch C and at 11 a shaft coupled, for example, by a flexible shaft or the like, to the differential D of the rear axle. Between the shafts 10 and 11 is disposed the epicyclic gear device more generally known by the name of "over-drive."

The over-drive consists of a satellite carrier 12, rigidly fixed on the shaft 10 and carrying satellites 13 which engage on the one hand with an external ring 14 rigidly fixed to the shaft 11 and coupled to the shaft 10 by a free wheel 15, and on the other hand with a sun gear 16. The sun gear 16 comprises a toothed portion 17 which can be locked at will on a toothed portion 18 on the satellite carrier in order to prevent the break in transmission which would be produced by the free wheel 15 in the case in which the vehicle is driven in reverse. But in the case of forward running, which is the only case to be considered for the use of the over-drive, the toothed portions 17 and 18 remain disengaged one from the other, as shown in Fig. 1. The sun gear 16 is rigidly coupled for rotation with a notched wheel 19 with which co-operates a locking member 20 adapted to engage between two successive notches on the wheel 19.

The member 20 is slidably mounted on a fixed support between a raised position in which it is disengaged from the wheel 19, and a lowered position in which it is engaged in the wheel 19. In the raised position of disengagement of the member 20, the sun gear 16 can rotate freely. The epicyclic train is inactive and only the free-wheel 15 acts between the shafts 11 and 10. There is thus either direct-drive or free-wheel, depending on whether the engine tends to drive the vehicle or not. In the lowered position of engagement of the member 20, the sun gear 16 is locked. The epicyclic train is active and there is an increase in gear ratio, or in other words an over-drive, with over-running of the free-wheel 15.

The member 20 is rigidly fixed to a plunger-core 21 engaged between two concentric solenoids, one internal solenoid 22 known as the holding solenoid, and an external solenoid 23 known as the operating solenoid. The core 21 is also rigidly fixed to a finger 24 having a projection 25. Under the projection 25 is engaged a return spring 26 which tends to raise the plunger 21 and the member 20 into the disengaged position resulting in direct-drive.

One extremity of the holding solenoid 22 is constantly connected to ground at 53. One extremity of the working solenoid 23 is connected to earth through a conductor 54 which carries a switch 55 controlled in dependence on the position of the moving assembly 20—21—24—25 so as to be closed when the member 20 is in the high disengaged position, and open when the member 20 is in the lower engaged position.

The other extremities 27 of the two solenoids 22 and 23 are joined together and connected by a conductor 28 to one contact of a relay 29, the other contact of which is connected through a conductor 30 to the battery 31 of the vehicle, which is itself connected to earth at 32.

The coil of the relay 29 has one extremity connected by a conductor 33 to a conductor 34 connected on the one hand through the medium of a general ignition contact 35 to the conductor 30, and on the other hand, to one primary terminal of the ignition coil 36. The other primary terminal of this coil 36 is connected by a conductor 37 to the hammer contact of the breaker-distributor 38, the anvil contact of which is connected to earth at 39. The other extremity of the coil of the relay 29 is connected through a conductor 40 to a contact 41 of a change-over switch 45 having two pairs of contacts 41, 42 and 43, 44.

The moving finger 46 of the change-over switch 45 is operated by the accelerator. This is arranged in such manner that it can be depressed slightly beyond its normal travel under the action of a force greater than that required during the normal travel. This extension in travel is obtained by means of an abrupt and complete forcing down of the accelerator pedal and is generally known by the term "kick-down." The finger 46 occupies one or the other of the two positions of the change-over switch 45, depending on whether the accelerator is located within the limits of its normal travel, or on the contrary, is subjected to a kick-down. In the normal position, the contacts 41 and 42 are connected and the contacts 43 and 44 are disconnected. In the position of kick-down, the contacts 41 and 42 are disconnected and the contacts 43 and 44 are connected.

The contact 42 associated with the contact 41 is coupled to a conductor 47 which is connected to earth and carries two switches in series; one switch 48 is closed during forward movement and open when running in reverse, and a switch 49 controlled by a centrifugal regulator 50 in dependence on the speed of the shaft 11, so as to be closed or open, according to whether the speed of the vehicle is greater or less than a pre-determined value, for example 40 km. per hour. The contact 43 of the change-over switch 45 is connected to earth through a conductor 51 which includes a switch 52 controlled by the position of the moving assembly 20—21—24 so as to be open when the member 20 is in the high disengaged position and to be closed when the member 20 is in the lower engaged position.

In accordance with the invention, a conductor 60 connects the contact 44 of the kick-down change-over switch 45 to the conductor 33. The conductor 60 comprises the coil 61 of a relay 62, the two fixed contacts of which are shown at 63 and 64.

In the example shown the clutch C is electrically operated and has a gripping force which varies with the value of current applied to the coil of this clutch, and is provided with suitable means for regulating the strength of the current; the contact 63 is connected by a conductor 65 to one extremity of the coil 66 of the clutch, the other extremity of which is connected to earth at 67, whilst the contact 64 is connected by a conductor 68 to the dynamo through the intermediary of suitable means of regulation. A switch 69, controlled by the gear-changing lever in such manner as to be opened or closed, depending on whether the lever is actuated or not, has one contact connected to earth at 70 and the other contact connected at 71 to the conductor 60.

During operation without kick-down, the contacts 41 and 42 are connected and the contacts 43 and 44 are disconnected. If the speed of the vehicle is less than, for example, 40 km. per hour, the switch 49 is open, and through the intermediary of elements 29, 22 and 23, the finger is raised whereby the vehicle is running in direct drive, that is to say without over-drive. When the speed of the vehicle exceeds 40 km. per hour, the switch 49 is closed, and through the intermediary of elements 29, 22, 23 and 19, the finger 20 moves down and is held in its lower position, whereby the vehicle is running with over-drive. When the user applies a kick-down, the contacts 43 and 44 are connected together, and this excites the coil 61 and disconnects the contacts 63 and 64. There is an immediate release of the clutch and the torque is reduced to zero in the transmission. All constraint is thus not only changed in direction between the finger 20 and the wheel 19 passing quickly through zero, but is in fact completely suppressed during the whole time required for the disengaging of the finger.

The finger 20 can thus be easily returned without any risk of failure, by the spring 26, the strength of which may even be reduced with advantage. This permits of the use of weaker solenoids, which thus consume less current.

As it rises, the finger 20 opens the switch 52 which de-energises the coil 61. The contacts 63 and 64 are once more connected, which causes the clutch to be re-engaged. It will be noted that the time-constant inherent in the coil 66 of the clutch helps to smooth the transition between the over-drive and the direct-drive. But the arrangement in accordance with the invention has, in addition, the notable property of providing a substantial acceleration of the engine speed when the engine is de-coupled from the transmission, and this acceleration which is produced before there is any reduction in the ratio of transmission is favourable to synchronisation. It will also be appreciated that the total elimination of the torque a 19—20 avoids all risk of jamming of the finger 20 and that any break of the ignition circuit is also avoided.

It will be understood that the invention is not limited to the form of construction shown in Fig. 3, but includes all equivalent alternative forms in its construction and its applications.

In an alternative construction of over-drive shown in Fig. 4, there is again shown at 10 the secondary shaft of the gear-box, at 11 the shaft coupled to the planetary gearing, at 12 the planet carrier, at 13 the planets, at 14 the crown ring and at 16 the sun gear.

The control member of the over-drive, indicated at 80, is fast for rotation but free in axial movement on the sun gear 16 and has the shape of a bell provided at its periphery and on both its faces with conical friction linings 81. The member 80 is mounted so as to be movable between a position in which the linings are applied against the crown ring 14 and a position in which they are applied against a fixed casing 82. The member 80 is controlled on the one hand by an elastic device 83 which tends to apply the linings 81 against the ring 14, and on the other hand by a hydraulic device 84 which, when it is operative, tends to apply the linings 81 against the casing 82.

The hydraulic device 84 is active or inactive, depending on the position of a cock 85 controlled on the one hand by a centrifugal regulator similar to the centrifugal regulator 50 and controlled by a shaft 11, and on the other hand by a member 86 actuated directly by the user.

In more detail, the hydraulic device 84 comprises a cylinder and a piston 90 defining therein two chambers 91 and 92. The rod 93 of the piston 90 is connected to the member 80. The chamber 91 is connected through a conduit 94 to one way 95 of the cock 85 which is a three-way cock. A second way 96 of the cock 85 is connected to a fluid pressure means 98 having a reservoir 99. The third way 97 of the cock 85 is connected through a conduit 100 to two parallel conduits 101 and 102. The conduit 101 is connected to the cylinder chamber 92 while the conduit 102 feeds the reservoir 99.

The actuating member 103 of the cock is movable between an operative position (shown in Fig. 4) whereby the ways 95 and 96 are connected with each other while the way 97 is isolated and a rest position angularly spaced at 90° from the operative position whereby the ways 95 and 97 are connected with each other while the way 96 is isolated. It will be understood that when the cock 85 is in operative position the fluid pressure is admitted in chamber 91, thereby moving the member 80 towards the left of Fig. 4 against the action of the spring 83 while in rest position the pressure is cut off in the chamber 91 and the spring 83 restores the member towards the right of Fig. 4.

The actuating member 103 is controlled through a transmission 104 from the regulator 50. The aforesaid member 86 is interposed in the transmission 104 to render operative or inoperative control of the member 103 by the regulator 50.

In normal operation, the member 86 is arranged in such manner as to make the cock 85 solely controlled by the centrifugal regulator 50.

When the speed of the shaft 11 is less than a predetermined value, the centrifugal regulator 50 short-circuits at 85 the hydraulic circuit and the spring 83, becoming preponderant, applies the friction linings 81 at 14, thus engaging the direct-drive. When the speed of the shaft 11 is greater than the predetermined value, the centrifugal regulator 50 renders the hydraulic circuit operative and this applies the friction linings 81 at 82 and engages the over-drive. An over-drive device of this kind may be mounted after a mechanical gear-box or it may form the last stage of an automatic box.

For the kick-down, the user accelerates and at the same time places the member 86 in its other position in which it annuls the action of the centrifugal regulator 50 and puts the hydraulic circuit out of action. This makes it possible to pass from the over-drive to the direct-drive but, in the absence of any special precautions, it would produce a slipping of the friction linings 81 and would thus produce wear while it is also insufficient to bring the shafts 10 and 11 to rotate in synchronism without a jerk.

The application of the invention to this type of over-drive enables once more the operation to be substantially improved. In accordance with the invention, the member 86 is coupled to a switch 87 similar to the switch 43—44 of Fig. 3 and which is inserted in the circuit of the relay 61 of the coil of the vehicle clutch. A switch 88 controlled by a time-delay mechanism or again by a means sensitive to the position of the over-drive, is preferably provided in this circuit so as to interrupt the current and to re-establish the clutch suitably, once the transfer to direct-drive has been obtained.

As in the previous case, the arrangement in accordance with the invention substantially facilitates synchronisation by virtue of a notable acceleration of the engine speed and has in this case the particular result of preventing or substantially reducing the wear on the friction linings 81.

All other equivalent alternative forms of construction and application also fall within the scope of the invention.

What we claim is:

1. An improved overdrive transmission system for automobile vehicles, including an engine, an accelerator pedal for said engine, a clutch, a gear-changing member and a gear-box with an over-drive gear device, said system comprising: clutch-actuating means for engaging and disengaging the said clutch; a kick-down device for controlling the operation of the said over-drive device; and means for co-ordinating the action of said clutch-actuating means and said kick-down device, whereby the clutch is disengaged when the said pedal is fully depressed and the operating member of the said kick-down device is thus actuated so as to pass from the over-drive to direct-drive gear.

2. An improved overdrive transmission system for automobile vehicles including an engine-operating accelerator pedal, a clutch, a gear-changing member and a gear-box with an over-drive gear device, the said system comprising: means actuated by a kick-down device for controlling the operation of said over-drive device; means actuated in dependence on the said kick-down device for disengaging said clutch when the said pedal is fully depressed and the over-drive device is rendered inoperative; and means actuated in dependence on the said kick-down device for re-engaging said clutch when said over-drive device has been released to couple the transmission in the direct-drive position.

3. An improved over-drive transmission system for automobile vehicles including an engine, an accelerator pedal for said engine, a clutch, a gear-changing member and a gear-box with an over-drive gear device, said system comprising: an epicyclic gear train constituting said over-drive device; means for rendering said over-drive operative and inoperative, including a locking member brought into and out of engagement with a member fixed to the sun-gear of said epicyclic train; a kick-down device for controlling the actuation of said locking member; means actuated in dependence on said kick-down device for disengaging said clutch when the said pedal is fully depressed and the over-drive device is rendered inoperative; and means actuated in dependence on said kick-down device for re-engaging said clutch when the transmission has passed into the direct-drive position.

4. An improved over-drive transmission system for automobile vehicles including an engine-operating accelerator pedal, a clutch, a gear-changing member and a gear-box with an over-drive gear device, said system comprising: an epicyclic gear train constituting said overdrive device; means for rendering said over-drive operative and inoperative, including a locking member brought into and out of engagement with a member fixed to the sun gear of said epicyclic train; a solenoid device for actuating said locking member, said solenoid being de-energised to release said member in dependence on the kick-down operation; means actuated in dependence on the said kick-down device for disengaging said clutch when the said pedal is full depressed and the over-drive is rendered inoperative; and means actuated in dependence on the said kick-down device for re-engaging said clutch when the transmission has passed into the direct-drive position.

5. A transmission system as claimed in claim 4, in which the electric circuit controlling the said solenoid device is associated with an electric circuit including means for disengaging the said clutch when the locking member is released to render the over-drive inoperative.

6. A transmission system as claimed in claim 4, in which the said means for disengaging and re-engaging the vehicle clutch comprises a relay device, the energising circuit of which is adapted to be closed and opened by means of a change-over switch actuated by the kick-down operating member.

7. A transmission system as claimed in claim 6, in which the circuit of the said relay device also includes a switch adapted to be actuated by the release and disengaging movement of the said locking member co-operating with the over-drive gear.

8. A transmission system as claimed in claim 4, in which the clutch of the said vehicle is of the electrically-operated type.

9. In an over-drive transmission system for automobile vehicles having an engine, an accelerator pedal for said engine, a clutch, a gear-box, an over-drive device movable between an overdrive position and a direct-drive position, means sensitive to the speed of the vehicle to bring said device in either position depending on whether said speed is above or below a predetermined value, a member sensitive to the extent of depression of said accelerator pedal and controlling said device to bring it into the direct-drive position, even though the speed of the vehicle brought it into the over-drive position, when the said accelerator pedal is fully depressed, the combination of a declutching control for said clutch and a connecting means between said member and said de-clutching control, said connecting means being adapted to de-clutching the clutch when the said accelerator pedal is fully depressed and to re-clutching the clutch when the said device is restored to the direct-drive position, whereby, during the passage from the overdrive position to the direct-drive position of said device, the engine speed is accelerated with no load and accommodates a synchronism condition.

10. A system as defined in claim 9 wherein said declutching control of said clutch includes a relay while said connecting means includes an electric circuit having said relay therein, comprising a switch means in said circuit and actuated by said member.

11. A system as defined in claim 9 wherein said declutching control of said clutch includes a relay while said connecting means includes an electric circuit having said relay therein comprising a first switch means in said circuit and actuated by said member and a second switch means for reclutching the clutch when said device is restored to the direct-drive position.

References Cited in the file of this patent

UNITED STATES PATENTS

| | | |
|---|---|---|
| 2,051,553 | Fleischel | Aug. 18, 1936 |
| 2,100,312 | Fawick | Nov. 30, 1937 |
| 2,453,156 | Neracher et al. | Nov. 9, 1948 |
| 2,597,840 | Randol | May 20, 1952 |
| 2,598,184 | Long | May 27, 1952 |